┌──────────────────────────────────────────────┐
United States Patent Office                  │
│                        3,305,537             │
│                  Patented Feb. 21, 1967      │
└──────────────────────────────────────────────┘

3,305,537
METHOD OF CATALYZING THE POLYMERIZA-
TION OF VINYL CHLORIDE
Georgette Steinbach van Gaver, Paris, and Georges
Zednik, Neuilly-sur-Seine, France, assignors to
Compagnie de Saint-Gobain, Neuilly-sur-Seine,
France
No Drawing. Filed Oct. 27, 1964, Ser. No. 406,910
9 Claims. (Cl. 260—92.8)

The present invention relates to a method of catalyzing the polymerization of vinyl chloride in mass and in solution, and is a continuation-in-part of application Serial No. 168,239, filed January 23, 1962, now abandoned. This invention may be considered as an improvement in the known system of associating a peroxide catalyst with a reducing agent in the polymerization of monomers containing 1 or more double bonds. In applying such systems to the polymerization of vinyl chloride difficulty has been experienced because vinyl chloride is a gas at ordinary temperature and boils at −12° C. under atmospheric pressure. At such low temperatures a variety of imperfections occur during the use of such catalytic mixtures. For example, hydrazine, a reducing agent has been associated with a typical peroxide catalyst monochloracetyl peroxide in this polymerization but was unable to initiate the polymerization of vinyl chloride at its boiling point even after 5 hours of agitation, whereas that same peroxide used alone would not polymerize vinyl chloride except at 45° C.

It is an object of this invention to carry out the polymerization of vinyl chloride, particularly in mass, at low temperatures, particularly at temperatures below or not substantially above the boiling point of vinyl chloride. The objects of the invention are accomplished generally speaking by a method of making polyvinyl chloride which comprises mixing liquid vinyl chloride with a catalytic amount of an organic peroxide catalyst and a minor amount of a trialkylboronhydrazine having from 1–4 C atoms in the alkyl groups, establishing in the mass a temperature at which polymerization proceeds, and isolating polymer from the mass. The catalytic systems which are the accomplishments of the present invention include mixtures in convenient proportions of a peroxide and of a trialkylboronhydrazine having the general formula

in which R is an alkyl radical containing from 1–4 C atoms.

These catalytic systems are characterized by great activity at temperatures below 0° C. in connection with vinyl chloride and they succeed in producing polymers which have qualities of molecular weight, structure, and mechanical properties which previously have been obtained only by polymerization at very low temperatures. One may employ the peroxide catalysts already known to be useful in the polymerization of unsaturated compounds, and particularly the ones which have among their compounds monochloracetyl peroxide, which is particularly useful as it is easily put in solution in dimethyl phthalate, enables one to control the content of active oxygen, and does not leave solid residues in the resins. Among the useful organic peroxides, other than chlorine substituted peroxides are acetyl peroxide and isopropyl peroxidicarbonate.

It is particularly surprising that this combination should be useful as none of its elements taken individually are capable of according a polymerization with an acceptable hourly rate of transformation of vinyl chloride at a temperature below 0°. By associating these compounds of the new system in the polymerization of vinyl chloride the polymerization may be carried out at the normal boiling point of vinyl chloride (−120° C.) and under conditions which give a satisfactory industrial yield.

Pure trialkylborons can initiate the polymerization of vinyl chloride at low temperature but they lose that property when they are associated with hydrazine as these complexes do not initiate the polymerization until a temperature of about 10° C. is reached. The new complexes are in effect stabilized against oxygen, and we have discovered that they are not stabilized against energetic oxidants. Their association with organic peroxide in accordance with this invention permits one to obtain a high concentration of free radicals which are active at low temperatures. The invention is manipulable without special precautions because, contrary to the trialkylborons, which are flammable in air, a grave disadvantage, the complexes of trialkylboronhydrazine are non-flammable in air. Further special advantages are that they can be used in stainless steel equipment and are effective at ordinary pressure.

The quantities of organic peroxide and of the complexes which are added to the vinyl chloride depends upon the temperature chosen for polymerization and the nature of the constituents in the system itself, the quantities of the complexes being favorably between .5 and 3% by weight of the vinyl chloride and the quantities of peroxide being about 1 mole for each 1 to 7 moles of the complex.

We have also found that the best hourly transformations occur at a certain ratio of the boron in the complex to the active oxygen in the peroxide (mB:mO) which varies according to the nature of the peroxide and with the temperature at which the polymerization is carried out. This ratio is about 3 for triethylboronhydrazine and monochloroacetyl peroxide for the polymerization of vinyl chloride at −12° C.

The complexes may be prepared by the reaction in inert atmosphere of hydrazine on the selected trialkylboron at a temperature between 55–60° C., the isolation being accompanied by distillation under vacuum. For example, the following method produces superior complexes: The reaction was carried out in a chamber under dry pure nitrogen, the reaction vessel was of 500 cc. volume, equipped with three tubes, with a mechanical agitator, and with a 100 cc. separation flask with a thermometer, and with a reflux refrigerant cooled by ice water. The chamber was scavenged with dry nitrogen. 25 cc. of 98% hydrazine were admitted to the chamber and into the flask were put 79.6 cc. of triethylboron. The triethylboron was dropped into the chamber drop by drop with agitation. White fumes formed at the beginning of the operation. This dropwise procedure was continued in order to maintain the temperature between 40–50° inside the chamber. An oily, colorless liquid was obtained and purified by distillation under vacuum with nitrogen and was collected in a trap at a temperature of −80° C. at discharge. After having removed the excess hydrazine (38%) there was recovered, under .2 mm. of mercury at 65° C., 70.35 g. of a liquid having the formula: $(C_2H_5)_3B \cdot NH_2—NH_2$ which is nonflammable in air, has a molecular weight of 130, and index of refraction of 1.4761 at 20° C., and a density of .852 at 20° C. The yield was 98% of the triethylboron used.

In making trimethylboronhydrazine one uses the same apparatus and method, employing 32.8 g. of trimethylboron at −80° liquefied which is connected by means of an intermediate flask, equipped with a valve, to the chamber having three tubes, which is mechanically agitated, with an inlet pipe containing fritted glass with a thermometer and with a refrigerated reflux which is itself connected to two traps maintained at −80° C. for condensing the trimethylboron which has not reacted. 35.4 cc. of 98% hydrazine (84% excess) is admitted to the flask under an atmosphere of dry nitrogen. A slight heating of the trap produced a gaseous release. The absorption of trimethylboron produced progressive heating. The temperature rose to 50° in the trap containing the liquefied trimethylboron and it was kept at that temperature until the trap was emptied. The oily liquid produced was distilled under vacuum and under nitrogen, and was collected in a trap at −80° C. at discharge. After having removed the excess hydrazine there was recovered under .1 mm. at 64°, 45.2 g. of a liquid which crystallized at 25–30° C., had a molecular weight of 88 and a density of .85 at 30°. Its formula is:

$$(CH_3)_3B.NH_2—NH_2$$

During the polymerization one may add advantageously a solvent such as methanol or acetone, which has the effect of better solubilizing the reactants, and may accelerate the polymerization with accompanying production at a higher hourly rate. The polyvinyl chloride resins obtained with the catalytic system of the invention are characterized by a stability superior to that of the resins obtained by prior art methods. They have higher molecular weight when they are polymerized at low temperatures. It is also possible to decrease this molecular weight by substantially increasing the proportion of solvent added to the vinyl chloride or by rupturing the polymer chain by aldehydes or chloride solvents.

When one wishes to produce plasticized vinyl chloride the polymerization may be carried out with plasticizers, such as those which are customarily used for polyvinyl chloride, present in situ during the polymerization. The phthalate plasticizers are exemplary of this phase of the process. The polymerization is not affected by the presence of the plasticizers which, when thus incorporated, facilitate the working and shaping of the polymer.

The following examples illustrate the invention without imposing a limitation upon the generalities of what is elsewhere stated and claimed herein.

*Example 1*

Into a two liter glass flask provided with an agitator, a thermometer, and with reflux refrigeration by means of acetone and Dry Ice ($CO_2$), after chilling to −80° C. there was put:

1000 g. of liquid vinyl chloride,
1.38 cc. of a solution of monochloroacetyl peroxide in dimethyl phthalate (containing 3% active oxygen) $d=1.2$, thus containing .3 millimole or 5 mg. per 100 g. of vinyl chloride,
3.06 cc. of triethylboronhydrazine, $d=.852$, which is 2.6 g./100 of vinyl chloride, making 2 millimole/100 g. vinyl chloride.

The polymerization was effectuated with a temperature rise to −10° at which it was stabilized by the reflux cooling. After 6 hours the polymerizaiton was stopped by pouring the contents of the flask into methanol. Part of the monomer was removed by evaporation, the residue was filtered, washed in methanol, and dried in the oven at 40°, then under 5 mm. Hg vacuum at 40°, yielding 15% of a very white polymer at a mean hourly rate of transformaiton of 2.5%.

*Example 2*

Several polymerizations were made of vinyl chloride, using triethylboron hydrazine and monochloroacetyl peroxide at different concentrations. The examples were carried out in a stainless steel, round bottomed vessel of 1200 cc. capacity, furnished with a cover, on which was mounted an anchor type agitator, a thermometer, and a reflux apparatus for the refrigerant containing methanol and $CO_2$ snow. The vessel was cooled to −80 C. and received its charge of liquid vinyl chloride plus an additional 20 cc. to sweep the vessel free of air. The monochloroacetyl peroxide, containing 3% active oxygen, in solution in dimethylphthalate was added drop by drop, and thereafter the triethylboronhydrazine was added. The vessel was closed, agitated, the temperature rose to −12° C., 20 g. of vinyl chloride was released to sweep out the air, and the refrigerant maintained the temperature. After opening the vessel the contents were filtered, washed in methanol, dried in an oven at 50° C. for two hours, then at 40° C. under vacuum. A summary of the examples follows:

| Test | Grams Vinyl-Chloride | Triethylboronhydrazine | | Monochloroacetyl peroxide | | Ratio mB/mO | Polymerization Time, hr. | Dry Polymer in Grams | Mean Hourly Rate |
|---|---|---|---|---|---|---|---|---|---|
| | | In cc. | In Millimoles per 100 g. of Vinyl-Chloride | In cc. | Active oxygen in Millimoles per 100 g. of Vinyl-Chloride | | | | |
| 1 | 800 | 0.61 | 0.5 | 1.11 | 0.313 | 1.6 | 7 | 2.15 | 0.04 |
|   | 800 | 0.61 | 0.5 | 0.89 | 0.25 | 2 | 6 | 29.5 | 0.61 |
|   | 800 | 0.61 | 0.5 | 0.56 | 0.156 | 3.2 | 6 | 92.9 | 1.94 |
|   | 800 | 0.61 | 0.5 | 0.45 | 0.125 | 4 | 6 | 55.05 | 1.02 |
|   | 800 | 0.61 | 0.5 | 0.28 | 0.078 | 6.4 | 6 | 18.3 | 0.38 |
| 2 | 800 | 1.22 | 1 | 7.1 | 2 | 0.5 | 6 | 7.8 | 0.16 |
|   | 800 | 1.22 | 1 | 3.55 | 1 | 1 | 6 | 16.8 | 0.35 |
|   | 800 | 1.22 | 1 | 1.78 | 0.5 | 2 | 6 | 77.8 | 1.77 |
|   | 800 | 1.22 | 1 | 1.11 | 0.313 | 3.2 | 6 | 148.3 | 3.1 |
|   | 800 | 1.22 | 1 | 0.89 | 0.25 | 4 | 6 | 109 | 2.26 |
|   | 800 | 1.22 | 1 | 0.71 | 0.20 | 5 | 6 | 71.8 | 1.5 |
|   | 800 | 1.22 | 1 | 0.56 | 0.156 | 6.4 | 6 | 38.05 | 0.79 |
| 3 | 800 | 2.45 | 2 | 3.55 | 1 | 2 | 6 | 101 | 2.1 |
|   | 800 | 2.45 | 2 | 2.2 | 0.625 | 3.2 | 6 | 135.3 | 2.83 |
|   | 800 | 2.45 | 2 | 1.8 | 0.5 | 4 | 6 | 136.7 | 2.85 |
|   | 800 | 2.45 | 2 | 1.11 | 0.313 | 6.4 | 4 | 63.8 | 2 |
|   | 800 | 2.45 | 2 | 0.56 | 0.156 | 12.8 | 6 | 13.5 | 0.28 |

The table shows that the mean hourly yield is highest when the ratio mB:mO is near 3 (in the case of triethylboronhydrazine). Some variation in the location of this optimum is to be expected with other alkylboronhydrazine complexes.

The polyvinyl chloride produced in test 2 with mB:mO=3.2 had the characteristics: a fine, very white powder of which the intrinsic viscosity was 270 cm.³/g. (by solution in cyclohexanone) while industrial polyvinyl chloride of K. Wert 67 under identical conditions had an intrinsic viscosity of 118 cm.³/g. A test piece was made by rolling the resin at 180° C. with 2% of dibasic lead stearate (stabilizer), and pressing at 205° C. It had a bending temperature of 87° C. whereas the industrial polyvinyl chloride worked under identical conditions decomposed, its rolling temperature was not over 165° C., its pressing temperature not over 170° C., and its bending temperature did not exceed 75–77° C.

The same resin from Example 2 was similarly blended with 5% by weight of the commercial stabilizer called Advastab T-17-M (an organo-tin-sulfide) and 1% of stearine resin as a lubricant. It was laminated at 200° C. and pressed at 210° C. Standard commercial polyvinyl chloride was identically blended and tested. The resins compared thus.

|  | Bending Test, °C. | Resistance to Traction, kg./cm.² | Elongation, percent |
| --- | --- | --- | --- |
| Polyvinyl chloride from Test 2 | 70 | 641 | 12 |
| Polyvinyl chloride (Commercial) | 64 | 600 | 180 |

Example 3

Using the same conditions of polymerization as in Example 2, into the same apparatus there was put:

800 g. vinyl chloride at −80° C.+20 g. for gas expulsion,
80 g. methanol at −80° C.,
1.11 cc. of monochloroacetyl peroxide of 3% active oxygen in dimethylphthalate solution,
1.22 cc. of triethylboronhydrazine.

After 5 hours and 45 minutes at −12° C., 180 g. of resin, a yield of 22.5% was obtained, a mean hourly transformation of 3.92%. This shows the accelerating effect of the methanol on the polymerization. The intrinsic viscosity of the resin was 285 cc./g.

If, under otherwise identical conditions one uses 1.78 cc. of monochloroacetyl peroxide and 1.22 cc. of triethylboron hydrazine, a ratio of mB:mO=2, one gets 167 g. of resin, a 20% yield, and a mean hourly rate of transformation of 3.33%.

Example 4

The conditions of Example 3 were duplicated as to vinyl chloride and methanol but with 1.78 cc. of the peroxide and 2.08 cc. of tributylboronhydrazine (1 millimole per 100 g. vinyl chloride) which is mB/mO=2, and after 2 hours and 35 minutes at −12° C. there were obtained 158 g. of white resin, slightly butyric as to odor, corresponding to a yield of 20% and a mean hourly rate of 6%.

Example 5

Operating as in Example 3 except that the methanol was replaced by 80 g. of acetone. After 4 hours of polymerization at −10° C. 176 g. of resin were produced, corresponding to a yield of 21.6% and a mean hourly rate of transformation of 5.4%, the polymerization having been accelerated by the solvent. The intrinsic viscosity of the resin was 196 cm.³/g., the molecular weight having thus been lowered by the solvent.

Example 6

Operating as in Example 3 there was added about 2% by weight of the vinyl chloride acetaldehyde in order to break the chain lengths and lower the molecular weight of the polymer. After 5 hours and 20 minutes of polymerization at −12° C., 117 g. of resin were produced corresponding to a yield of 14.6% and to a mean hourly rate of transformation of 2.74%. The intrinsic viscosity of the resin was 150 cm.³/g.

Example 7

Repeating Example 3 without methanol but adding 5% by weight of the vinyl chloride in dioctyl phthalate and polymerizing at −12° C. for 8 hours, then expelling residual vinyl chloride at −10° C. by agitation and drying to constant weight, there was produced 180 g. of a fine, soft powder which contained 22% of dioctyl phthalate. The yield of pure polyvinyl chloride was about 17.6%, which coresponded to a mean hourly transformation of 2.2%. The intrinsic viscosity of the pure resin, after elimination of the dioctyl phthalate by extraction of a part of the polymer in ether was 295 cm.³/g.

Some test pieces were prepared from this preplasticized resin by adding 5% of the weight of the resin of Advastab T-17-M stabilizer and .5% of stearine resin, rolling at 200° C. to incorporate the additives and pressing at 210° C. to test the product. The results were compared with commercial, high grade polyvinyl chloride test pieces made of polyvinyl chloride to which had been added 22% of dioctyl phthalate stabilizer based on the weight of the resin and 5% of Advastab T-17-M and .5% of stearine resin and incorporated by rolling and pressing at 150° C.

|  | Bending Temperature, °C. | Resistance to Traction, kg./cm.² | Elongation, percent |
| --- | --- | --- | --- |
| Polyvinyl chloride of Example 7 | 17 | 321 | 356 |
| Commercial polyvinyl chloride | 17 | 244 | 384 |

Example 8

Using the same conditions of polymerization as in Example 2, into the same apparatus were put:

800 g. vinyl chloride at −80° C.+20 g. for gas expulsion,
80 g. chilled methanol,
1.29 ml. of a solution of acetyl peroxide in dimethylphthalate.

This solution contained 3.26 g. active oxygen per 100 ml. (i.e. 5.275 mg. active oxygen in 100 g. vinyl chloride), and 1.04 g. triethylboronhydrazine (i.e. 130 mg. in 100 g. vinyl chloride).

The vessel was closed, agitated, the temperature rose to −1° C. 20 g. vinyl chloride was released to sweep out the air, and the vessel was kept at −1° C. agitated, for 10 hours. 220 g. of resin was obtained, the mean hourly transformation rate being 2.75%.

In the same conditions, but without triethylboronhydrazine there was no polymerization at all.

Example 9

The same conditions of polymerization of Example 8 were duplicated, but with 1.65 ml. of a solution of isopropyl peroxidicarbonate in ethyl maleate, instead of acetyl peroxide. This solution contained 2.66 g. active oxygen per 100 ml. (i.e. 5.28 mg. active oxygen per 100 g. vinyl chloride).

After 16 hours at −7° C., 420 g. of resin was obtained. The yield was 52%, the mean hourly transformation rate being 3.2%.

In the same conditions, but without triethylboronhydrazine there was no polymerization at all.

Although only a limited number of embodiments of the invention are described in detail in the foregoing specification, it is to be expressly understood that the invention is not limited thereto. Various other changes which will now be apparent to those skilled in the art may also be made without departing from the spirit and scope of the invention.

What is claimed is:

1. A method of making polyvinyl chloride which comprises mixing liquid vinyl chloride with a catalytic quantity not substantially over 5% of an organic peroxide catalyst, a minor quantity of a reducing agent for the peroxide consisting essentially of trialkylboronhydrazine having the alkyl groups attached to boron, and having 1-4 C atoms in each alkyl group, and a plasticizing amount of a plasticizer of polyvinyl chloride, establishing in the mass a temperature below about 0° C. at which polymerization proceeds, and isolating polymer from the mass.

2. A method according to claim 1 in which the ratio mB:mO is equivalent to about 3 for triethylboronhydrazine.

3. A method according to claim 1 in which the polymerization is at about −12 to −10° C.

4. A method according to claim 1 in which the trialkylboronhydrazine is between about 0.5 and about 3% of the weight of the monomer.

5. The method of claim 1 in which the peroxide catalyst is present about 1 mole to each 1–7 moles of the hydrazine reducing agent.

6. The method of claim 1 in which the moles of boron are to the moles of active oxygen in the peroxide as about 3:1.

7. A method of polymerizing vinyl chloride in bulk, which comprises mixing liquid vinyl chloride and a catalytic mass including a trialkylboronhydrazine complex, the alkyl groups of which contain 1–4 C atoms and are attached to boron, and an organic peroxide catalyst for vinyl chloride, the peroxide being present at about 1 mole to each 1–7 moles of the complex and the complex being about .5 to about 3% by weight of the monomer, at constant volume and at a temperature circa −12° C.

8. A method of making polyvinyl chloride which comprises mixing vinyl chloride free of other monomers with a catalytic amount, less than about 5%, of an organic peroxide catalyst for vinyl chloride, and a minor amount of a trialkylboronhydrazine having alkyl groups of 1–4 C atoms attached to boron, at a temperature, below about 0° C., at which polymerization proceeds, and isolating polymer from the mass.

9. A method of producing polyvinyl chloride at temperatures beneath about 0° C., which comprises polymerizing vinyl chloride in mass in contact with a trialkylboronhydrazine complex having 1–4 carbon atoms attached to boron, and an organic peroxide, there being about 3 molecules of said complex for 1 molecule of said organic peroxide.

No references cited.

JOSEPH L. SCHOFER, *Primary Examiner.*

J. F. McNALLY, *Assistant Examiner.*